(12) United States Patent
Stevens et al.

(10) Patent No.: US 6,337,084 B1
(45) Date of Patent: *Jan. 8, 2002

(54) EXTRUSION OF AMINO ACID ANIMAL FEED SUPPLEMENTS

(75) Inventors: Joseph Michael Stevens, Monticello; Michael J. Fleckenstein, Decatur, both of IL (US)

(73) Assignee: Archer Daniels Midland Company, Decatur, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,919

(22) Filed: Apr. 24, 1998

(51) Int. Cl.[7] .......................... A23K 1/165; A23K 1/18; A01J 1/10
(52) U.S. Cl. ........................ 424/442; 424/438; 426/516; 426/517
(58) Field of Search ................................ 426/516, 517; 424/438, 442

(56) References Cited

U.S. PATENT DOCUMENTS

| | | | |
|---|---|---|---|
| 4,753,804 A | * | 6/1988 | Iaccheri et al. ............ 426/491 |
| 5,034,232 A | | 7/1991 | Sugitani et al. |
| 5,077,074 A | | 12/1991 | Van Lengerich |
| 5,186,970 A | | 2/1993 | Ogiwara et al. |
| 5,290,560 A | | 3/1994 | Autant et al. |
| 5,532,008 A | | 7/1996 | Sasaoka et al. |
| 5,565,234 A | | 10/1996 | Teraguchi et al. |
| 5,622,710 A | | 4/1997 | Binder et al. |
| 5,660,852 A | * | 8/1997 | McKeown et al. ......... 424/438 |
| 5,958,977 A | * | 9/1999 | Ikeda et al. ................. 424/438 |

OTHER PUBLICATIONS

Co–Extrusion Systems in the Food and Confectionery Industries. Confectionery Production, 1985, vol. 51, No. 9, p. 492.

(List continued on next page.)

*Primary Examiner*—Thurman K. Page
*Assistant Examiner*—S. Tran
(74) *Attorney, Agent, or Firm*—Laff, Whitesel & Saret, Ltd.; J. Warren Whitesel

(57) ABSTRACT

A process uses extrusion technology for the production of a dense amino acid feed supplement. The feed supplement comprises of one or more substantially pure amino acids preferably selected from a group of lysine, threonine or tryptophan, alone or in combination. In one embodiment, a substantially pure amino acid is mixed with water to provide an extrudable mixture with a desired moisture content. The extrudable mixture is fed into an extruder and extruded through a die to provide at least one noodle of dense cohesive material. In another embodiment, at least one noodle is segmented, dried, milled and sieved to provide granules with a particle size range of between about 177 micron and 1190 micron. In a further embodiment, two substantially pure amino acids are mixed to provide a mixture which is extruded to produce at least one noodle. In yet another embodiment, water is removed from an enriched amino acid fermentation broth which is then blended with an additional amount of lysine free base to provide a mixture which is then extruded to provide at least one noodle.

23 Claims, 5 Drawing Sheets

OTHER PUBLICATIONS

Chiruvella R. V. et. al. Numerical Simulation of the Extrusion Process for Food Materials in a Single–screw Extruder. Journal of Food Engineering 1996, vol. 30, No. 3–4, pp. 449–467.

Kokini J. L. et. al. Fundamentals of Single and Twin–Screw Food Extrusion. Abstracts of Papers of The American Chemical Society, 1992, vol. 204, No.Pt1, Abstract: 149–AGFD.

Session RR; Extrusion Technology Thursday a.m. Journal of The American Oil Chemists Society, 1983, vol. 60, No. 4, pp. 750–751.

The IUPAC–IUB Joint–Commission–On–Biochemical–Nomenclature (JCBN) Nomenclature and Symbolism for Amino–Acids and Peptides–Recommendations 1983. The Biochemical Journal, 1984,m vol. 219, No. 2, pages: 345–373.

* cited by examiner

EXTRUSION OF AMINO ACID ANIMAL FEED SUPPLEMENTS

This invention relates to a use of extrusion technology to manufacture an animal feed supplement comprising of at least one amino acid. In particular, the invention relates to a process comprising an extrusion step to provide a substantially free-flowing, non-dusting, granular amino acid feed supplement.

BACKGROUND OF THE INVENTION

Amino acids, and in particular lysine, threonine and tryptophan, are used extensively in the animal feed industry. Traditionally, amino-acids used in the animal feed supplements are produced via fermentation, and purified through various methods of filtration, centrifugation, and crystallization. The final purified products are then dried by any suitable means, such as spray drying, fluid bed drying, or the like, and are then the dried product is packaged for sale.

The formulation of these products is an important consideration because large amounts, especially of lysine, have to be handled and mixed with other feed constituents. Such problems as dust and clumping need to be minimized while the free flowing characteristic of these products needs to be maximized. Hence, there is a need for a process for the manufacture of amino acid feed supplements which minimizes dust and clumping while still leading to an animal feed with free flowing characteristics.

A process in which an animal feed comprising pellets is produced is described in U.S. Pat. No. 5,622,710. The feed additive is typically pelletized using mixing tools. Expensive to operate high shear mixing tools are required to obtain dense pellets. In addition, a high shear mixing plant usually operates in batch mode. Hence, there is a need for a simpler process to produce a dense product and which can operate in batch, semi-continuous and continuous modes of operation.

In addition, a reliable operation of high shear mixing plant to provide a consistent high quality amino acid feed supplement is difficult to achieve. In particular, the operating parameters are not amenable to tight control. Thus, there is a need for a process in which the operating parameters are more amenable to tight control.

The modern day extruder can provide a dense cohesive product of uniform size, and also provide actions such as mixing, kneading and cooking. Additionally, these machines can greatly increase the bulk density in the final product. There is a concurrent need in the animal feed industry to increase bulk density in order to benefit from lower packaging, handling and storage costs. A density of 35 lbs/ft$^3$ to 45 lbs/ft$^3$ can greatly reduce costs by eliminating the need to pay freight and transportation costs for shipping essentially air in and around fluffy material, by reducing health hazards resulting from breathing air laden by light dusty material, and by reducing the need to clean an area where the fluffy material has settled.

Operating parameters in the extrusion process can be tightly controlled. For example, temperature in the extruder can be modulated using water or suitable heat transfer fluid in the heads surrounding the extruder barrels. The conveying rate, degree of mixing and the nature and extent of compressive forces applied to the extrudable mixture during the extrusion process are controlled by screw configuration. In turn, a screw configuration is controlled by the flight distance, the use of shear locks, conical elements and where appropriate reverse flighting. Moisture, often in the form of steam, can be adjusted by direct injection into the extruder barrels of the extruder.

The use of extrusion technology is quite widespread in the food and confectionery industry and has been in commercial use as early as the 1920's in the manufacture of pasta. Examples of publications include: *Journal Of The American Oil Chemists Society*, 1983, Vol.60, No.4, pp.750–751; *Confectionery Production*, 1985, Vol.51, No.9, p.492; *Abstracts Of Papers Of The American Chemical Society*, 1992, Vol.204, No.Pt1, pp.149-AGFD; *Journal Of Food Engineering*, 1996, Vol.30, No.3–4, Pp.449–467.

U.S. Pat. No. 5,186,970 describes a food extrusion method comprising forcing a food material through a die. A food forming apparatus is also described which comprises a food extrusion zone to an extrusion end of which a die having an orifice shape corresponding to the shape of a final food product is fitted, and a suction chamber which encloses the outside of the die and whose inside is evacuated to a reduced pressure by a vacuum means.

U.S. Pat. No. 5,034,232 describes the preparation of a flavored imitation meat protein material having a fibrous structure and a fried product thereof. The process comprises treating an aqueous mixture of a protein raw material and a flavor material with a twin-screw extruder under high temperature and pressure, extruding through a die with the expansion of the extruded material, and optionally drying the extruded material.

U.S. Pat. No. 5,290,560 describes the preparation of granules for the feeding or treatment of ruminants. The granules comprise active materials and a meltable binder such as a polyethylene wax. The granules are designed for trans-rumen passage without incurring degradation. The process comprises extruding a mixture through one or more dies. The active materials include amino acids such as methionine, lysine or its salts, phenylalanine, histidine, arginine, tyrosine and tryptophan, and medicoments such as vitamins, antibiotics, anti-parasitic agents and proteins. The granules of active materials are intended for the feeding or treatment of ruminants.

U.S. Pat. No. 5,077,074 describes the preparation of cookie products involving extrusion heating and wire cutting. The process comprises adding cookie ingredients to a cooker extruder to form a heat treated mass, which is admixed with additional cookie ingredients to form a dough-like cookie mixture. The cookie mixture is subsequently wire cut into individual pieces.

SUMMARY OF THE INVENTION

Accordingly, an object of this invention is to provide a process for the manufacture of amino acid feed supplements which minimizes dust and clumping while still leading to an animal feed with free flowing characteristics. A more particular object is to provide a simpler process to produce a dense amino acid feed supplement. Another object is to provide a dense amino acid feed supplement on a batch, semi-continuous or continuous basis. Yet another object is to provide a process in which the operating parameters are more amenable to tight control.

Other objects features and advantages of the present invention will be apparent from the following detailed description of the invention.

This invention generally entails a method for producing a substantially free-flowing, non-dusting, granular amino acid feed supplement comprising the steps of mixing at least one substantially pure amino acid to provide an extrudable mixture and then extruding the extrudable mixture to provide at least one noodle.

In one embodiment, at least one noodle is segmented and dried to provide substantially dry segments. Then, milling the substantially dried segments provides granules. Sieving the granules provides a substantially free-flowing, non-dusting, granular amino acid feed supplement, preferably in a size range between about 177 micron and 1190 micron.

BRIEF DESCRIPTION OF THE DRAWINGS

The invention will be best understood from the following specification taken with the attached drawings, in which.

DETAILED DESCRIPTION OF THE INVENTION

Figure 1:
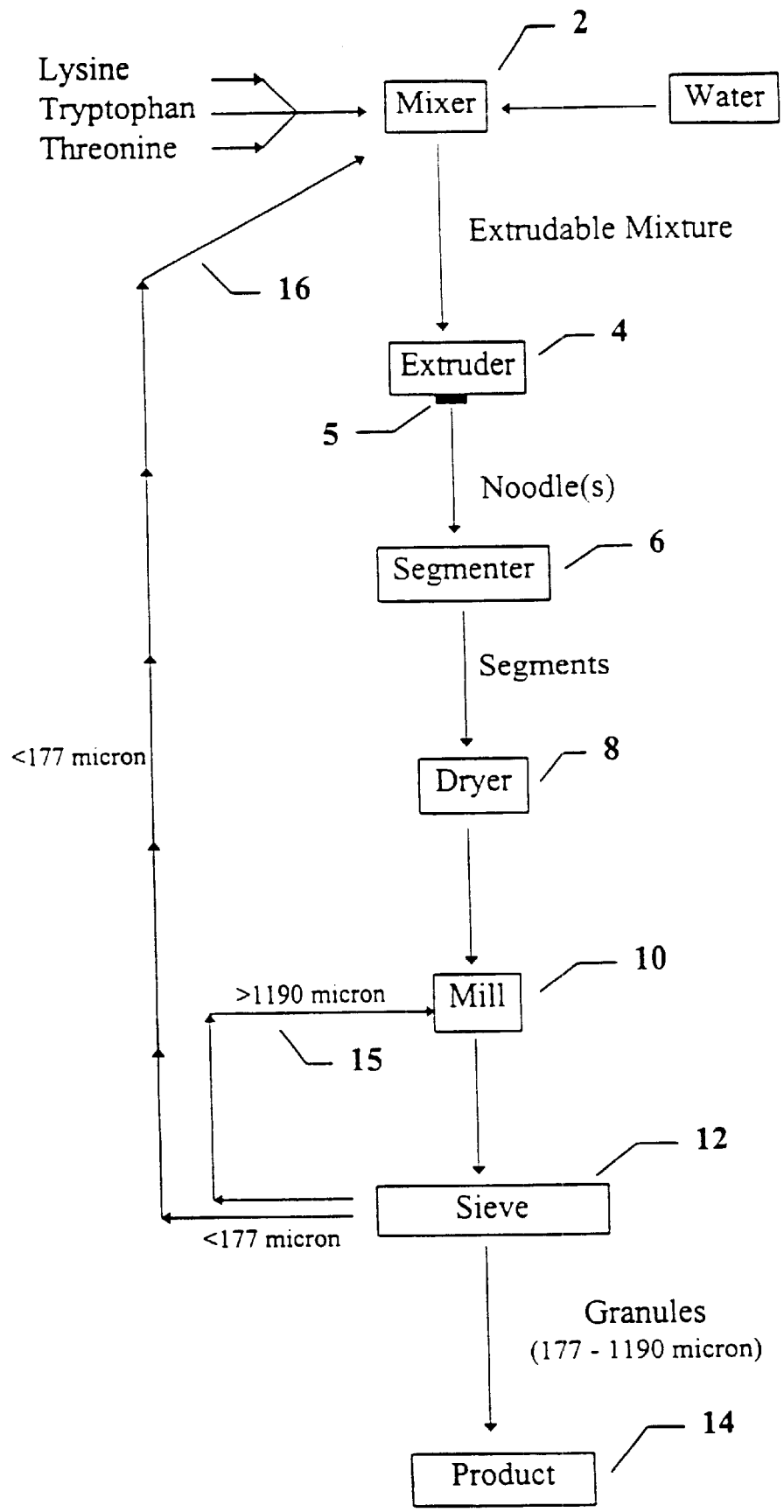
FIG. 1 is a flow chart showing the steps in one embodiment of the inventive process used with lysine, tryptophan or threonine.

In the present invention, the preferred amino acids are lysine (for example, in the form of lysine hydrochloride), threonine and tryptophan. Other suitable amino acids that may be processed by the present invention include: leucine, isoleucine, valine, proline and alanine. Still other suitable amino acids (or their complexes) for the present invention include: cysteine, aspartate, glutamate, phenylalanine, glycine, histidine, methionine, asparagine, glutamine, arginine, serine and tyrosine.

By "substantially pure amino acid" we mean an amino acid which is not covalently bonded to a different amino acid. Hence, animal or plant protein which generally contains up to 20 different amino acids (A, C, D, E, F, G, H, I, K, L, M, N, P, Q, R, S, T, V, W and Y; using the IUPAC-IUB single-letter amino acid nomenclature) connected by means of a polypeptide backbone of chemically bonded amino acids are not suitable sources of substantially pure amino acids for use with the present invention. For details on amino acid nomenclature see (for example): The IUPAC-IUB Joint-Commission-On-Biochemical-Nomenclature (JCBN) Nomenclature And Symbolism For Amino-Acids And Peptides-Recommendations 1983 by A. Cornishbowden in the Biochemical Journal, 1984, Vol.219, No.2, pages: 345–373.

According to the present invention, prior to mixing, a substantially pure amino acid has a purity in the range between about 35% to 100%, and preferably in the range 98% to 100% by dry weight. If an extrudable mixture comprises of two substantially pure amino acids, the specific purity relative to each of the amino acids decreases, but the total content of a substantially pure amino acid is the sum of the two substantially pure amino acid types. The essential point here is that the amino acids are not covalently bonded and exist in substantially pure form within the extrudable mixture, noodle and in the final product of the present invention. The total substantially pure amino acid content in the extrudable mixture, noodle, segment and final product is in the range between about 35% to 100% by dry weight, and preferably in the range between about 98% to 100% by dry weight.

The exact nature of the means for mixing is not critical, suitable mixing equipment includes: a ribbon mixer, paddle mixer, and plow mixer.

By "extruding" we mean forcing an extrudable mixture (for example, comprising of lysine, threonine, and tryptophan, alone or in combination) through an orifice, preferable a die, and preferably corresponding to a cross section diameter of between about 0.5 mm and 10 mm. By "extrudable mixture", we mean a mixture that is sufficiently dense and cohesive to be meaningfully extruded to produce at least one noodle which is capable of being segmented. For example, if a mixture contains too much water vs. solids, it is likely that extruding such a mixture would result in a useless slurry. The desired extrudable mixture has a moisture content in the range of between about 0% and 40% by weight, and preferably in the range of between about 15% and 30% by weight.

The extruder may be jacketed and the temperature may or may not be controlled. The means for extruding the extrudable mixture may have more than one screw, such as a twin screw co-rotating extruder and at least one orifice. The configuration of the screw is an important variable because they can vary the conveying, mixing and compressive forces applied to the material.

A Wenger model TX52 twin screw extruder is suitable for extruding the extrudable mixture to provide at least one continuous noodle. In one mode of operation, the Wenger model TX52 twin extruder is fitted with a die comprising of two openings. Each opening accommodates two inserts each of which defines an orifice 2 mm in diameter to provide a total of 4 orifices each of which are 2 mm in diameter. In this configuration, the extruder can provide 4 noodles. Other suitable types of extruders include a single screw positive displacement extruder.

Experience has shown that there is a relationship between the extruder speed, extruder load, die size and pressure at the die. In turn, experience has also shown that there is a relationship between noodle velocity (i.e. the velocity of noodle emerging from the die), cutting rate and segment length. For a given noodle velocity, it is possible to vary the cutting rate to produce segments of a pre-determined length.

The extruder can have any suitable number of orifices. Such an extruder would produce a plurality of noodles and thereby raise the output production levels. It is anticipate that the best result will be obtained by cutting the plurality of noodles concurrently. For example, a rotating knife could be located to segment the plurality of noodles in each complete rotation. While an extrudable mixture can be fed into the extruder by hand, we prefer to feed the extrudable mixture on a continuous basis. It is our experience that when the extruder is being run on a continuous basis it is easier to produce segments of predetermined length. At this point there are a number of options.

By "noodle" we mean at least one linear tube of dense cohesive material preferably comprising substantially pure lysine, threonine, and tryptophan, either alone or in combination. The noodle typically has a moisture content in the range between 15% and 30% by weight. The noodle or noodles may be produced on a continuous or semi-continuous basis or a batch basis and then divided to provide segments. While the exact nature of the segmenting means is not critical, it is preferred that segmenting is achieved by using a cutting means. The cutting means could be a wire or a knife. While the exact nature of the cutting means is not critical, we prefer a rotating knife located in close proximity to the outlet of the extruder.

The lengths of the segments are preferably in the range between about 1 mm and 50 mm, and more preferably between about 1 mm and 10 mm. The cross section diameter of the segments are preferably in the range between about 0.5 mm and 10 mm, and more preferably between 0.5 mm and 2 mm. The composition of the segments will mirror the composition of the noodle. Consequently, the segments preferably comprise of lysine, threonine, and tryptophan, alone or in combination.

The segments could represent a valuable commercial product particularly if the operating parameters of the extrusion and cutting operations are carefully controlled to produce segments which are in the size or volume range between about 0.5 mm$^3$ and 1.0 mm$^3$ with a low moisture content, preferably below about 5% by weight after drying.

While the type of dryer is not too important, we prefer to use a fluid bed dryer, tunnel dryer, or tray dryer.

In the preferred embodiments, the segments are dried and then milled and sieved to provide a substantially free-flowing, non-dusting, granular amino acid feed supplement in the size range between about 177 micron and 1190 micron. Amino acid granules with a particle size greater than about 1190 microns in cross section diameter are returned to the mill for regrinding. Particles which are smaller than about 177 microns are returned to the mixer. The particles in the size range between about 177 micron and 1190 micron are bagged.

Alternatively, the segments are milled, dried and sieved to provide granules in the preferred particle size range of between about 177 micron and 1190 micron. Granules outside this size range are recycled.

While the means for sieving are not too important, we prefer to use a continuous vibratory screener or an oscillatory screener.

The following embodiments and examples represent specific but non-limiting embodiments of the present invention.

In keeping with a first embodiment of this invention, which will be best understood with reference to FIG. 1, the process of producing an amino acid feed supplement might be described somewhat, as follows:

(i) At least one substantially pure amino acid such as lysine, tryptophan and threonine is mixed with water in a mixer 2 in order to make an extrudable mixture.

(ii) The extrudable mixture is fed to an extruder 4 and forced through at least one die to produce at least one noodle comprising a tube of dense cohesive material.

(iii) The noodle is then segmented by a segmenter 6.

(iv) The segments are dried by a dryer 8 to become substantially dry.

(v) The substantially dry segments are fed to a mill 10 and milled to provide granules.

(vi) The granules are screened and sorted for size at sieve 12 (preferably 80 mesh).

(vii) Granules in the size range between about 177 micron and 1190 micron pass through the sieving process and are acceptable as an end product at 14. Granules which are greater than about 1190 micron are recycled at 15 to mill 10, and particles which are less than about 177 micron are recycled at 16 to the mixer 2.

Figure 2:
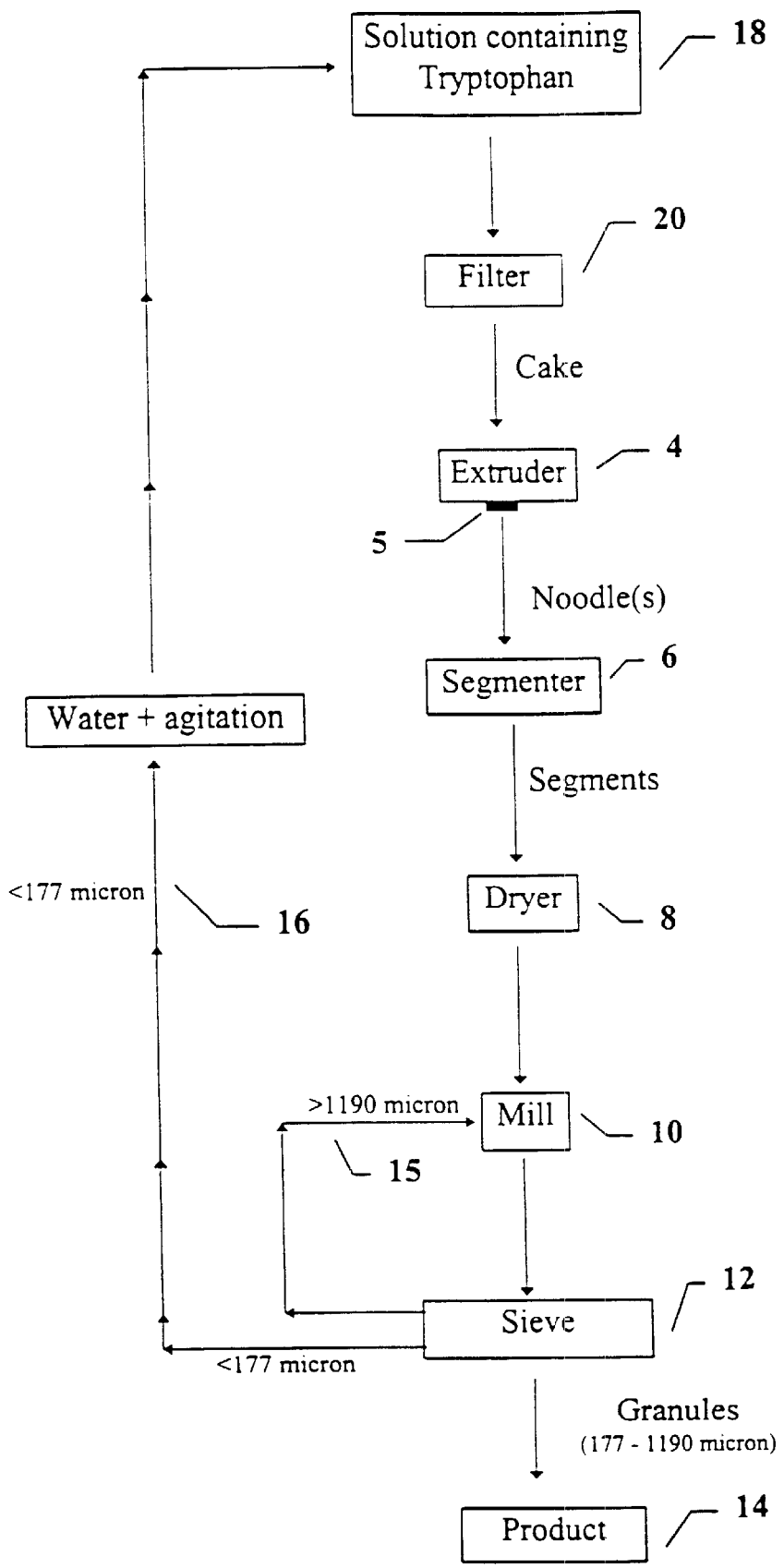
FIG. 2 is a flow chart showing the steps in second embodiment of the inventive process used with tryptophan.

In keeping with a second embodiment of this invention, which will be best understood with reference to FIG. 2, the process of producing an amino acid feed supplement might be described somewhat, as follows:

(i) A solution containing tryptophan 18 is filtered 20 to make an extrudable mixture in the form of a cake with a solids content in the range between about 50% and 100% on a dry weight basis, and a total substantially pure amino acid content in the range between about 35% and 100% on a dry weight basis, and preferably in the range between about 98% and 100%.

(ii) The extrudable mixture is fed to an extruder 4 and forced through at least one die to produce at least one noodle.

(iii) The at least one noodle is segmented by a segmenter 6.

(iv) The segments are dried by a dryer 8 to become substantially dry.

(v) The substantially dry segments are fed to a mill 10 and milled to provide granules.

(vi) The granules are screened and sorted for size at sieve 12 (preferably 80 mesh).

(vii) Granules in the size range between about 177 micron and 1190 micron pass through the sieving process and are acceptable as an end product at 14. Granules which are greater than about 1190 micron are recycled at 15 to mill 10, and particles which are less than about 177 micron are recycled at 16.

Figure 3:
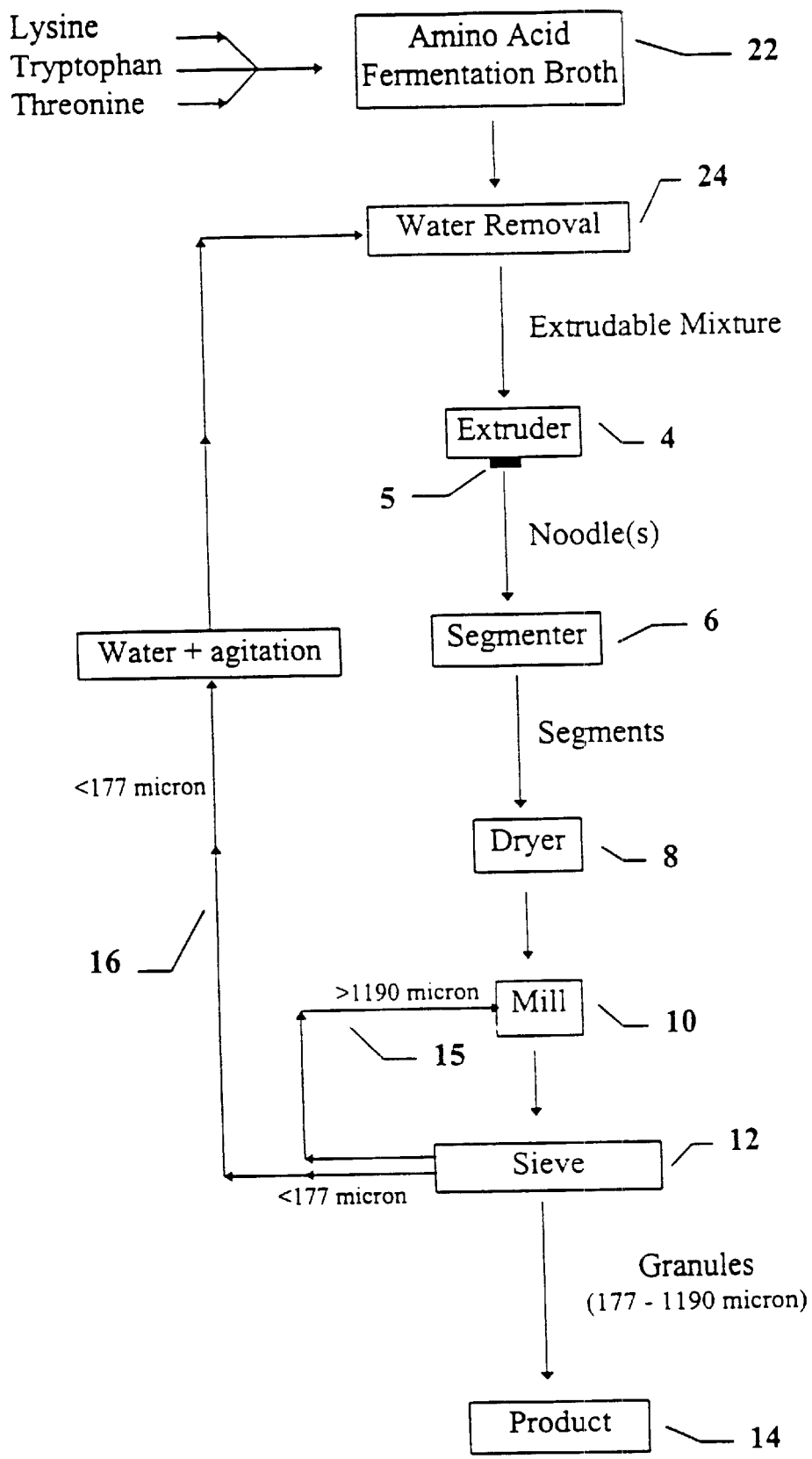
FIG. 3 is a flow chart showing the steps in a third embodiment of the inventive process used with lysine, tryptophan, or threonine.

In keeping with a third embodiment of this invention, which will be best understood with reference to FIG. 3, the process of producing an amino acid feed supplement might be described somewhat, as follows:

(i) Add at least one substantially pure amino acid (such as lysine, tryptophan and threonine, either taken alone, or in combination) to an amino acid fermentation broth 22 to provide an enriched fermentation broth. The amino acid fermentation broth may be lysine fermentation broth, tryptophan fermentation broth or threonine fermentation broth, or any suitable combination thereof.

(ii) Water is removed 24 from the enriched fermentation broth by spray drying. At least one substantially pure amino acid (not shown) is added to provide an extrudable mixture which is fed into an extruder 4 and forced through at least one die to produce at least one noodle.

(iii) The at least one noodle is segmented by a segmenter 6.

(iv) The segments are dried by a dryer 8 to become substantially dry.

(v) The substantially dry segments are fed to a mill 10 and milled to provide granules.

(vi) The granules are screened and sorted for size at sieve 12 (preferably 80 mesh).

(vii) Granules in the size range between about 177 micron and 1190 micron pass through the sieving process and are acceptable as an end product at 14. Granules with a particle size outside this range are recycled (not shown in FIG. 3).

Figure 4:
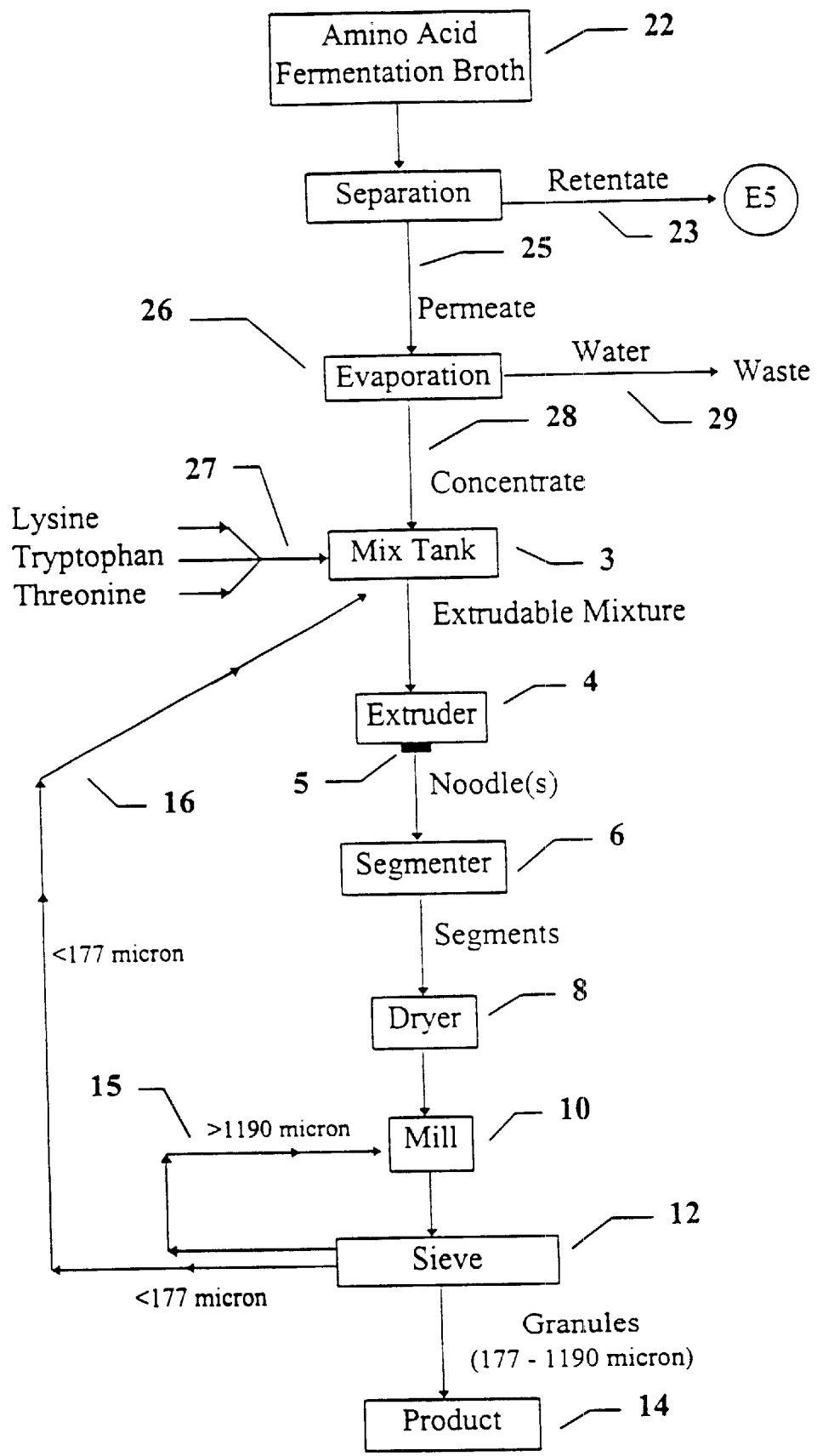
FIG. 4 is a flow chart showing the steps in a forth embodiment of the inventive process in which permeate is processed.

In keeping with a fourth embodiment of this invention, which will be best understood with reference to FIG. 4, the process of producing an amino acid feed supplement might be described somewhat, as follows:

(i) Any suitable means to separate the amino acid fermentation broth may be used such as ultrafiltration or centrifugation. The separating of an amino acid fermentation broth 22, preferably by ultrafiltration means, to produces a substantially cell free broth (shown as permeate at 25) and a cell rich broth (shown as retentate at 23). The cell rich broth may be processed as described in the fifth embodiment (shown as E5 in FIG. 4). The amino acid fermentation broth may be lysine fermentation broth, tryptophan fermentation broth or threonine fermentation broth, or any suitable combination thereof. If ultrafiltration is used, the ultrafilter should have a molecular weight cutoff between about 10,000 Dalton and 500,000 Dalton, preferably about 500,000 Dalton.

(ii) The substantially cell free broth is evaporated at 26 to remove water and to produce a substantially cell free concentrated broth (shown as concentrate at 28). Preferably, the substantially cell free concentrated broth 28 has between about 30% and 70% solids by weight. Waste water is drained away at 29. Evaporation is carried out in the approximate range of temperature between 140° F. and 214° F., preferably between 145° F. and 155° F., and pressure range between 2.9 psia and 11 psia (vacuum), preferably 2.9 psia to 4 psia.

(iii) The amino acid concentration of the substantially cell free concentrated broth is adjusted to be in the range between about 35% and 90%, by dry weight. The adjustment is made at 27 by blending at least one substantially pure amino acid (such as lysine, tryptophan and threonine, either taken alone, or in combination) to provide an extrudable mixture in the form of a substantially cell free enriched broth.

(iv) The extrudable mixture is fed into an extruder 4 and forced through at least one die to produce at least one noodle. A single die is shown at 5.

(v) Each noodle is segmented by a segmenter 6 to produce segments.

(vi) The segments are dried by a dryer 8 to provide substantially dry segments.

(vii) The substantially dry segments are fed to a mill 10 and milled to provide granules.

(viii) The granules are screened and sorted for size at sieve 12 (such as 80 mesh).

(ix) Granules in the size range between about 177 micron and 1190 micron pass through the sieving process and are acceptable as an end product at 14. Granules with a particle size outside this range are recycled (not shown).

Good results are obtained when the at least one substantially pure amino acid has a purity in the range between about 95% and 100%, and preferably in the range 98% to 100% by dry weight. For example, ion exchanged lysine in the non-salt form of lysine or lysine free base achieves good results if it is added to lysine fermentation broth or spray dried lysine fermentation broth. Also, the amino acid fermentation broth may contain between 0% and 100% of original biomass. The biomass may be reduced by a suitable means, such as by centrifugation.

Care should be taken either to use (FIG. 5) or to properly dispose of the cell rich broth (shown as rententate in FIG. 4 and FIG. 5) at 23. The cell rich broth is often regarded as a waste material which can present particularly difficult disposal problems if released as sewage into the environment. The cell rich retentate is particularly harmful because it contains a high amount of biodegradable bio-organic matter. Consequently the retentate exerts a high biochemical/biological oxygen demand (BOD); BOD refers to the requirement for molecular oxygen which accompanies oxidative microbial break-down of bio-organic matter in the environment. This can result in oxygen starvation conditions downstream at effluent discharge points and cause wide scale death of aquatic life resulting in further BOD problems leading to stagnant water-ways and potential health and safety problems, particularly with regard to farm animals which might drink from the polluted water-ways.

Figure 5:
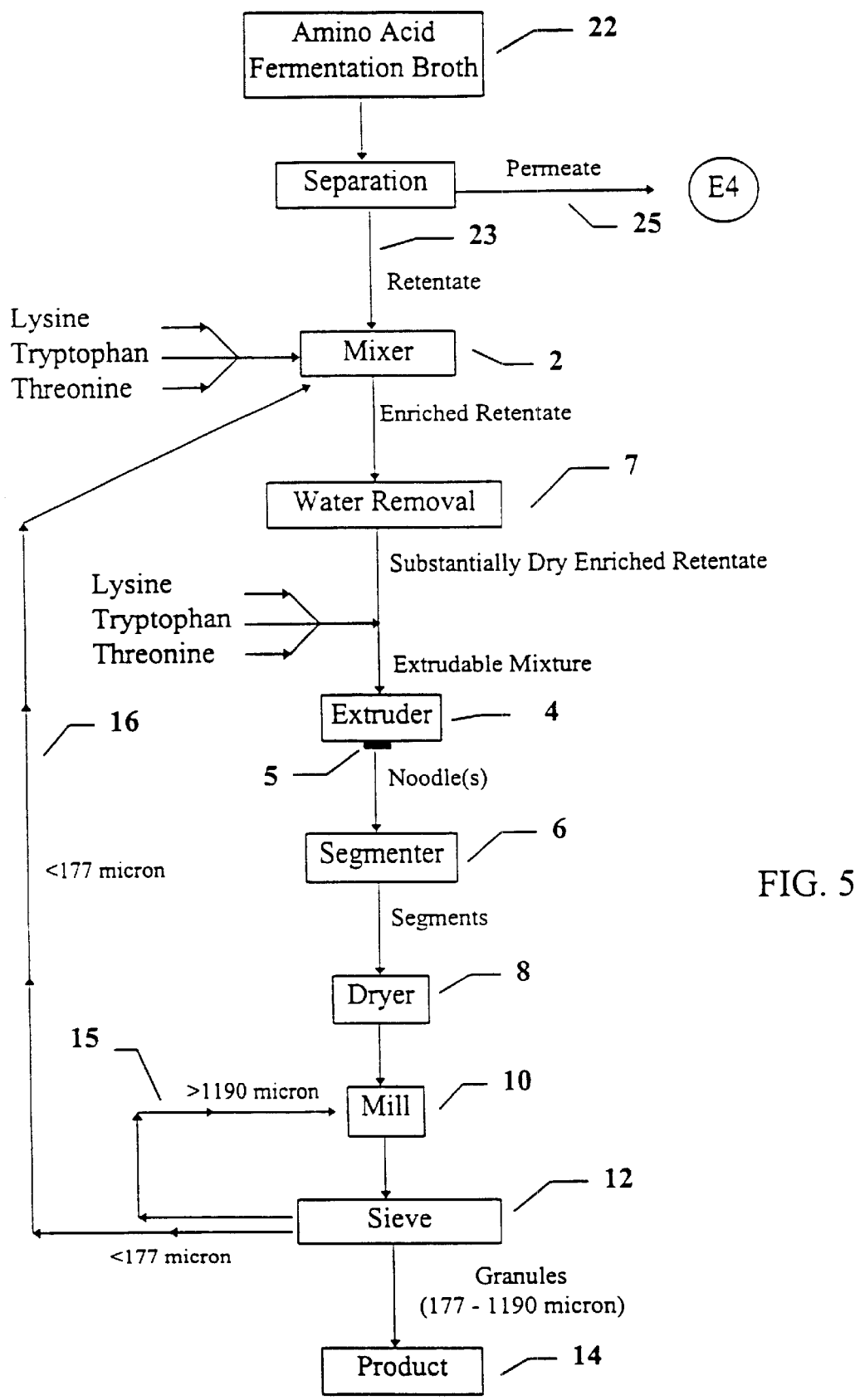
FIG. 5 is a flow chart showing the steps in a fifth embodiment of the inventive process in which retentate is processed.

In a fifth embodiment, which is best understood by reference to FIG. 5, both the substantially cell free permeate and cell rich retentate are used as separate starting points in the current invention. In keeping with the fifth embodiment, the process of producing an amino acid feed supplement might be described somewhat, as follows:

(i) Any suitable means may be used to separate the amino acid fermentation broth, such as, for example, ultrafiltration or centrifugation. The separating of an amino acid fermentation broth 22 by ultrafiltration means to produce a substantially cell free broth (shown as permeate at 25) and a cell rich broth (shown as retentate at 23). The substantially cell free broth (shown in E4 in FIG. 5) may be processed as described in the fourth embodiment. The amino acid fermentation broth may be lysine fermentation broth, tryptophan fermentation broth or threonine fermentation broth, or any suitable combination thereof. If ultrafiltration is used, the ultrafilter should have a molecular weight cutoff between about 10,000 Dalton and 500,000 Dalton, preferably about 500,000 Dalton.

(ii) At least one substantially pure amino acid (such as lysine, tryptophan and threonine, either taken alone, or in combination) is blended with the cell rich broth at 2 in order to provide an enriched cell rich broth (shown as enriched retentate).

(iii) Water is removed, by a suitable method, such as spray drying, from the enriched cell rich broth at 7 and then the substantially dry enriched cell rich broth (shown as substantially dry enriched retentate) is blended with at least one substantially pure amino acid (such as lysine, tryptophan and threonine, either taken alone, or in combination) to provide an extrudable mixture.

(iv) The extrudable mixture which is fed into an extruder 4 and forced through a die to produce at least one noodle.

(v) The noodle is segmented by a segmenter 6 to produce segments.

(vi) The segments are dried by a dryer 8 to become substantially dry.

(vii) The substantially dry segments are fed to a mill 10 and milled to provide granules.

(viii) The granules are screened and sorted for size at sieve 12 (such as 80 mesh).

(ix) Granules in the size range between about 177 micron and 1190 micron pass through the sieving process and are acceptable as an end product at 14. Granules with a particle size outside this range are recycled (not shown in FIG. 5).

EXAMPLE 1

37.5 pounds of substantially dry lysine hydrochloride having a purity of 97.7% and 17.3 pounds of tryptophan filter cake having a purity on a dry weight basis of 95.73% and a moisture content of 32.2% by weight were mixed in a ribbon blender until well dispersed (after about 15 minutes). The resulting mixture was fed into the inlet of a Wenger model TX52 twin screw extruder configured to produce 4 noodles. The extruder screws were turning at a rate between about 163 RPM and 202 RPM. The temperature in the extruder varied between about 75° F. at the inlet and 176° F. at the outlet. Pressure at the die was between about 200 psi and 600 psi. The linear tube of dense cohesive material was cut into segments with a knife containing 2 to 6 blades and turning at about 1805 RPM. Water was fed into the extruder at a rate of between about 0.16 liters per minute and 0.25 liters per minute. Screw speed was varied between about 163 RPM and 202 RPM. The segments comprise of about 27.6% tryptophan and 73.8% lysine hydrochloride on a dry basis.

The segments were milled on a model DASO 6 Fitzmill using a 0.095" screen. This yielded a granulated product having the size composition indicated in Table 1.

TABLE 1

| +16 mesh >1190 micron | +40 mesh 420 to 1190 micron | +80 mesh 177 to 420 micron | −80 mesh <177 micron |
|---|---|---|---|
| 9.6% | 56.6% | 17.2% | 16.5% |

EXAMPLE 2

90 pounds of substantially dry lysine hydrochloride (98.8% pure measured as percentage by weight; moisture content of 0.33% measured as a percentage by weight) was mixed with water 1.8 gal to produce a mixture of lysine hydrochloride and water with a moisture content of 14%, measured as a percentage of weight. The resulting mixture was fed into the inlet of a Wenger model TX52 twin screw extruder. Water and the lysine hydrochloride were extruded through a 10 mm die to produce a linear flow of dense cohesive material which was cut into segments with a knife attached to the outlet of the extruder. The segments had an lysine hydrochloride purity of about 95.9% lysine hydrochloride on a dry basis. The extruder operating parameters were:

| | |
|---|---|
| Extruder speed | 140 RPM to 252 RPM |
| Load | 12% to 38% of maximum |
| Dry Feed | 1.2 lb/min to 3.0 lb/min |
| Water Feed | 0.3 lb/min to 0.6 lb/min |
| Knife speed | 925 RPM to 975 RPM |
| Zone Temperature: | 71° F. at the inlet to 129° F. at outlet |

EXAMPLE 3

A solution containing tryptophan was filtered to make a cake with a solids concentration of 72.6%. The material was then fed into the extruder and extruded. Two different dies were used, a 3 mm face die and a 1.5 mm ring die. Both dies gave good results. The final product has a purity of 98.1% tryptophan on a dry basis. The extruder conditions are as follows:

| | |
|---|---|
| Extruder speed | 240 RPM |
| Load | 16% to 36% of maximum |
| Feed | Hand fed |
| Pressure at die | 200 to 400 psig |
| Zone Temperature: | 86° F. at the inlet to 177° F. at outlet |

EXAMPLE 4

Lysine fermentation broth was ultrafiltered using a molecular weight cutoff of 500,000 Dalton to produce a cell rich concentrate. This ultrafilter retentate was mixed with a pure grade lysine to provide an enriched fermentation broth with about 23.9% lysine, by dry weight. The enriched fermentation broth was spray dried, blended with an additional amount of pure grade lysine and extruded to produce one or more noodles. A noodle was dried and has a purity of about 40.4% lysine, measured as freebase on a dry basis. The extruder conditions are:

| | |
|---|---|
| Extruder speed | 270 RPM |
| Load | 13% to 22% of maximum |
| Feed cylinder speed | 250 RPM |
| Zone Temperature: | 92° F. at the inlet to 121° F. at outlet |

While the invention is described above in connection with preferred or illustrative embodiments and examples, they are not intended to be exhaustive or limiting of the invention. Rather, the invention is intended to cover all alternatives, modifications and equivalents included within its spirit and scope of the invention, as defined by the appended claims.

The claimed invention is:

1. A continuous process for providing substantially dry and uncoated segments consisting essentially of at least one amino acid as substantially the only active ingredient, said at least one amino acid being 35%–100% pure on a dry weight basis, said process comprising the steps carried out in the following order:
   (a) mixing a starting material consisting essentially at least one substantially pure amino acid with an aqueous solution to make an extrudable mixture which is sufficiently dense and cohesive to provide at least one noodle, said at least one amino acid being selected from a group consisting essentially of lysine, tryptophan and threonine;
   (b) extruding said extrudable mixture with a compressive force to provide at least one dense and cohesive noodle which can be segmented;
   (c) segmenting said at least said one noodle to provide said segments;
   (d) drying said segments of step (c) to make substantially dry segments;
   (e) milling said substantially dry segments of step (d) to make dense free-flowing non-dusting randomly shaped granules; and
   (f) sieving said granules of step (e) to select granules having a size range of about 177–1190 microns.

2. The process according to claim 1 wherein the aqueous solution of step (a) comprises water.

3. The process of claim 1, wherein said at least one amino acid of step (a) has a purity in the range between about 98% to 100% amino acid by dry weight.

4. The process of claim 1, wherein said extrudable mixture of step (a) has a moisture content in the range between 0% and 40%.

5. The process of claim 1, wherein said extrudable mixture of step (a) has a moisture content in the range between about 15% and 30%.

6. The process of claim 1, wherein the means for extruding said extrudable mixture is carried out in an extruder selected from a group consisting essentially of: a twin screw co-rotating extruder and a single screw positive displacement extruder.

7. A process for providing a substantially free-flowing, non-dusting, granular amino acid feed supplement comprising at least one amino acid as substantially the only active ingredient in said feed supplement, said process comprising the following steps in the order named:
   (a) mixing a starting material including at least one amino acid with an aqueous solution to make an extrudable mixture;

(b) extruding said extrudable mixture of step (a), said extrusion making said starting material sufficient dense and cohesive to provide at least one noodle;

(c) segmenting said at least one noodle of step (b);

(d) drying said segments of step (c) to make dry segments which are substantially free of all moisture content;

(e) milling said substantially dry segments of step (d) to provide randomly shaped granules; and (f) sieving said granules of step (e) to provide a dense, substantially free-flowing, non-dusting, non-coated granular amino acid feed supplement in the size range between about 177 micron and 1190 micron.

8. The process of claim 7, wherein said at least one amino acid is selected from a group consisting essentially of lysine, tryptophan and threonine.

9. The process of claim 7, wherein said at least one amino acid is selected from a group consisting essentially of: leucine, isoleucine, valine, proline and alanine.

10. The process of claim 7, wherein said at least one amino acid is selected from a group consisting essentially of: cysteine, aspartate, glutamate, phenylalanine, glycine, histidine, methionine, asparagine, glutamine, arginine, serine and tyrosine.

11. The process of claim 7, wherein the means for drying in step (d) is selected from a group consisting essentially of: a fluid bed dryer, tray dryer and rotary dryer.

12. The process of claim 7, wherein the means for sieving said granules of step (f) is performed on a batch basis.

13. The process of claim 7, wherein the means for sieving said granules of step (f) is performed on a semi-batch basis.

14. The process of claim 7, wherein a means for sieving said granules of step (f) is selected from a group consisting essentially of: a continuous vibratory screener and an oscillatory screener.

15. A process for providing a dense substantially free-flowing, non-dusting, granular amino acid feed supplement having a particle size of between about 177 micron and 1190 micron, said process comprising the following steps in the named order:

(a) removing water from a solution to make a cake, said cake being dense and cohesive to form at least one noodle, said solution having at least one amino acid as substantially the only active agent, said amino acid being selected from a group consisting essentially of lysine, threonine, and tryptophan, said cake having a solids content in the range between about 50% and 100 on a dry basis;

(b) extruding said cake of step (a) through an extruder to provide and compact said at least one noodle;

(c) segmenting said at least one noodle of step (b);

(d) drying said segments of step (c) to make substantially dry segments which are substantially free of moisture content;

(e) milling said substantially dry segments of step (d) to provide randomly shaped granules; and (f) sieving said randomly shaped granules of step (e) to provide a dense, substantially free-flowing, non-dusting, non-coated granular amino acid feed supplement in the size range between about 177 micron and 1190 micron.

16. A process for providing a substantially free-flowing, non-dusting, granular amino acid feed supplement having a particle size of between about 177 micron and 1190 micron, said process comprising the following steps in the named order:

(a) mixing substantially pure forms of lysine, threonine, and tryptophan, alone or in combination, to make an extrudable mixture which is sufficiently dense and cohesive to form a noodle which can be segmented and having a moisture content in the range between about 0% and 40% and a total amino acid content of between about 35% and 100% on a dry weight basis, said amino acid being substantially the only active ingredient, said mixture being free of covalently bonded amino acids;

(b) extruding said extrudable mixture of step (a) with a compressive force to provide at least one noodle which is sufficiently dense and cohesive to segment;

(c) segmenting said at least one noodle of step (b);

(d) substantially drying said segments of step (c) to make dry segments substantially free of all moisture content;

(e) milling said substantially dry segments of step (d) to provide randomly shaped granules; and (f) sieving said granules of step (e) to provide a dense, substantially free-flowing, non-dusting, non-coated granular amino acid feed supplement in the size range between about 177 micron and 1190 micron.

17. The process of one of the claims 1, 7, and 15 wherein the extruding of step b) is carried out at a temperature in the range of 75° F. to 176° F. and at a die pressure in the range of 200 psi–600 psi.

18. The process of claim 1 wherein the segments of step c) are about 27–28% tryptophan and about 73–74% lysine hydrochloride on a dry basis.

19. The process of claim 1 wherein said amino acid is lysine and in step a) was about 95–99% pure lysine hydrochloride on a dry weight basis and a moisture content of about 32–33% by weight.

20. The process of claim 17 wherein the extruder has a 10 mm die.

21. The process of claim 17 wherein said extruder has a die selected from a group consisting of a 10 mm die, a 3 mm die, and a 1.5 mm ring die.

22. The process of one of the claims 1, 7, 15, and 16 wherein the amino acid is lysine and in step a) is an ultra filtered starting material.

23. The process of claim 22 wherein the ultra filtered starting material is passed through an ultra filter having a molecular weight-cutoff of 500,000 Dalton.

* * * * *

UNITED STATES PATENT AND TRADEMARK OFFICE
CERTIFICATE OF CORRECTION

PATENT NO. : 6,337,084 B1
DATED : January 8, 2002
INVENTOR(S) : Stevens et al.

It is certified that error appears in the above-identified patent and that said Letters Patent is hereby corrected as shown below:

Column 12,
Line 42, please delete "step a) was about" and insert therein -- step a) is about --.

Signed and Sealed this

Fourth Day of June, 2002

Attest:

JAMES E. ROGAN
Attesting Officer  Director of the United States Patent and Trademark Office